Patented Apr. 26, 1938

2,115,560

UNITED STATES PATENT OFFICE 2,115,560

METHOD OF FORMING RUBBER ARTICLES

Stewart R. Ogilby, West New Brighton, N. Y., assignor, by mesne assignments, to United States Rubber Company, New York, N. Y., a corporation of New Jersey No Drawing. Application April 28, 1934, Serial No. 722,967

2 Claims. (Cl. 18—58)

This invention relates to methods of forming rubber articles and more particularly to methods of forming rubber articles directly by deposition of rubber from aqueous dispersions of rubber, such as rubber latex.

The preparation of rubber articles by deposition of rubber from aqueous dispersions, such as rubber latex, has generally been accomplished by filtration methods, electro-deposition methods, and coagulation methods. In filtration methods commonly used, a film of thickened rubber dispersion, which may or may not be agglomerated or coagulated, is formed on the surface of a porous mold by applying suction to the interior of the mold and dipping the same into an aqueous dispersion of rubber. The thus coated mold or form may then be removed from the rubber dispersion, the coating dried, vulcanized, if desired, and the finished rubber article removed from the surface of the mold. Various types of porous forms have been utilized, such as clay or gypsum forms, or perforate metal or rubber forms covered with a thin layer of cloth, and, if desired, with a superposed coating or slip of clay formed by dipping the fabric covered perforate form into a clay suspension while maintaining suction in the interior of the form for a short period of time. In electro-deposition methods, the rubber is deposited on the surface of a mold or form of the desired shape with the aid of an electric current. In preparing rubber articles by coagulation methods, the rubber is deposited from the aqueous dispersion of rubber by chemical coagulation rather than by a filtration onto the surface of the form or by electro-deposition. Various methods of treating porous and non-porous forms with a coagulant and subsequently dipping into latex or treating first with latex and then coagulant, and repeating the operations as desired, have been suggested. Dipping molds and forms have been coated with absorbent materials, such as gelatin, or rubber cement mixed with a coagulant prior to dipping into latex to form a rubber deposit of the desired thickness. Coatings or slips of water-insoluble finely divided material have heretofore not been utilized in coagulation methods of depositing rubber from aqueous dispersions of rubber. It is found, however, that coatings of substantially water-insoluble finely divided material may be utilized in a number of ways to great advantage in coagulation methods of depositing rubber from latex and like dispersions.

The present invention relates to coagulation methods of forming rubber articles directly from aqueous dispersions of rubber on a form or mold, and more particularly to coagulation methods wherein a slip or coating of substantially water-insoluble finely divided material is associated with the surface of the mold or form prior to treatment with the aqueous dispersion of rubber.

According to the present invention the surface of the mold or form is associated with a substantially water-insoluble finely divided material and an agglomerant or coagulant of an aqueous dispersion of rubber prior to dipping or otherwise treating the form with the rubber dispersion. The coating of finely divided material may itself be relatively inactive toward a latex composition, as for example a clay slip, and in such a case the finely divided material may be associated with an agglomerant or coagulant of latex, such as an acetic acid coagulant, to form a coating of a composition comprising both a coagulant and a finely divided material. The finely divided material may itself be an agglomerant or coagulant of latex, or it may be a material which at elevated temperatures or which in contact with a sensitizing agent or a solubilizing agent becomes a latex agglomerant or coagulant. In utilizing the slips or coatings of finely divided material in coagulation methods, there is the two-fold advantage of providing a material which aids in removing the finished article from the surface of the form, and also of providing a coating on the surface of the form throughout the thickness of which there is present an active agglomerant or coagulant of the latex. The first of these advantages is, of course, also present in filtration methods and electro-deposition methods, but the second advantage is unique in coagulation methods of depositing latex. A coating of finely divided solid material, which may contain an agglomerant or coagulant, or which under the conditions of deposition may itself act as an agglomerant or coagulant, provides the advantage over prior coagulation methods by presenting to the latex the desired agglomerant or coagulant throughout the thickness of the coating. Prior methods of associating a coagulant on the surface of a form with a continuous and relatively impermeable film of, for example, gelatin or rubber cement, provides a coagulant which is available for diffusion into the latex into which the treated form is dipped only at the contact surface of the coagulant coating. With a coating of a finely divided solid material, the discontinuity and permeability of the film affords a larger surface of agglomerating or coagulating material in contact with the dispersion and hence a thicker deposit will result than without the use of such finely divided material or with the use of a continuous film as of gelatin or rubber cement.

As specific illustrations of various manners of carrying out the invention, but without intention of limiting the invention except as required by the prior art, the following examples are included:

*Example 1.*—This example illustrates the deposition of rubber on a form surfaced with a finely divided water-insoluble material and a liquid coagulant. A mandrel was made up by wrapping a perforate metal form with cloth until the thickness of the cloth was 0.14 inch. A clay-celite slip (mixture of clay and diatomaceous earth) was deposited on the cloth from an aqueous suspension of the same by means of vacuum until the thickness was 0.1 inch, making a total of 0.24 inch of absorbent cover with the outer portion comprising finely divided solid material. The form was then dipped for 30 minutes in a mixture of acetic acid and denatured alcohol, and subsequently in a creamed latex having a total solids of 57.2%. The mandrel was removed from the latex bath and the adhering coating dried. This gave a rubber article having a thickness of .041 inch.

*Example 2.*—The following illustrates the deposition of rubber on a form surfaced with a finely divided material which when heated acts as an agglomerating or coagulating agent for latex. An impervious form was painted with a suspension of zinc hydroxide and water and another with a suspension of calcium hydroxide and water and allowed to dry. These forms were dipped for 30 minutes in a concentrated latex having a solid content of 55% and containing vulcanizing ingredients. When these forms were dipped into the latex at a temperature between 10° C. and 20° C. very little deposit of rubber on the form resulted. When these forms, however, were heated to a higher temperature, between 60° C. and 90° C., a heavy deposit of thickened or coagulated rubber was built up on the surface of the form in the same dipping time. The thickness of the deposit on the calcium hydroxide coated form was greater than on the zinc hydroxide coated form. A form was then coated with zinc hydroxide and letters painted on the surface of the zinc hydroxide with calcium hydroxide and the form dipped at elevated temperatures into the latex as described above. The letters appeared in relief on the finished article. If desired, the latex may be heated rather than the form, since the latex itself has not been made heat sensitive except at the surface of the form by virtue of the coating material on the form and coagulation of the main body of latex will not take place as it would in heating a body of heat sensitive latex. The present method also eliminates the necessity for providing cooling means as is necessary in a body of heat sensitive latex into which a heated form may be dipped.

*Example 3.*—The following illustrates the deposition of rubber on a form surfaced with a material which may be sensitized to act as an agglomerant or coagulant of increased activity. The same form coated with zinc hydroxide as used in Example 2 was dipped in a concentrated latex having 55% solids content and containing 4 to 8 cc. of 25% ammonium sulphate solution per 100 grams of latex solids. This dipping operation was performed at a temperature between 10° C. and 20° C. and, unlike the case where at these temperatures without the addition of ammonium sulphate, as shown in Example 2, very little deposit of rubber resulted, there was in this case a very heavy deposit built up in from 30 to 60 minutes. The ammonium sulphate acts as a sensitizing or solubilizing agent on the zinc hydroxide and thus with the finely divided solid material, a thick layer of rubber may be built up without the aid of heat. Salts of ammonia, such as the chloride, sulphate and acetate are suitable for activating the latex coagulation when either zinc hydroxide, zinc oxide or calcium hydroxide is used on the form. Other materials may be used on the surface of the form and in the latex so that they will be mutually active in inducing agglomeration or coagulation at various relatively low temperatures.

*Example 4.*—The following illustrates a water-insoluble finely divided agglomerant formed by metathesis. A glazed porcelain form was dipped into a suspension of calcium sulphate and magnesium hydroxide formed by allowing a solution of magnesium sulphate to interact with a suspension of calcium hydroxide. The thus coated form was dipped into a concentrated latex of about 50% solids content containing suitable accelerator and curing ingredients for 30 minutes, and thereby was produced a deposit of rubber having when dried a thickness of about .020 inch.

These examples illustrate only a few of the many methods of utilizing coatings or slips of finely divided solid material on the surface of molds or forms in coagulation methods of depositing rubber directly from latex.

The terms "latex" and "aqueous dispersion of rubber" are used to designate broadly coagulable dispersions of elastic materials, including artificial dispersions of rubber or rubber-like materials as well as natural latex, which may be preserved or compounded or otherwise treated as desired and which may be in a normal, diluted, concentrated or purified condition produced by methods well known in the art. Such a latex may be unvulcanized and, if desired, may contain vulcanizing ingredients, whereby it may be vulcanized during or after drying on the form, or it may be prevulcanized, all as is well known in the art. The film or coating of finely divided solid material may be applied to the film or form by spreading, spraying, and the like, as well as by the preferred dipping operation, as described in the above examples, and the aqueous dispersion may subsequently be applied in a similar manner to the thus-treated form.

In view of the many changes and modifications that may be made without departing from the principles underlying the invention, reference should be made to the appended claims for an understanding of the scope of the invention.

Having thus described my invention, what I claim and desire to protect by Letters Patent is:

1. A process which comprises applying to the surface of a form a coating comprising a substantially water-insoluble finely divided material which acts on the form at elevated temperature but not appreciably at ordinary temperature as an agglomerant or coagulant of an aqueous dispersion of rubber associated with such form, and associating the coated form with an aqueous dispersion of rubber at such elevated temperature.

2. A process which comprises applying to the surface of a form a coating comprising a substantially water insoluble hydroxide from the group consisting of calcium hydroxide and zinc hydroxide and associating the thus coated form with an aqueous dispersion of rubber at an elevated temperature.

STEWART R. OGILBY.